UNITED STATES PATENT OFFICE.

FELIX KUNERT AND EDWIN ACKER, OF OFFENBACH-ON-THE-MAIN, GERMANY, ASSIGNORS TO CORPORATION OF CHEMISCHE FABRIK GRIESHEIM-ELEKTRON, OF FRANKFORT-ON-THE-MAIN, GERMANY.

PROCESS OF PRODUCING DYESTUFFS ON THE FIBER BY MEANS OF THE ONE-BATH METHOD.

1,127,027.          Specification of Letters Patent.          Patented Feb. 2, 1915.

No Drawing.          Application filed April 17, 1914.   Serial No. 832,532.

*To all whom it may concern:*

Be it known that we, FELIX KUNERT and EDWIN ACKER, citizens of the German Empire, and residents of Offenbach-on-the-Main, in the Grand Duchy of Hesse, Germany, have invented new and useful Improvements in Processes of Producing Dyestuffs on the Fiber by Means of the One-Bath Method, of which the following is a specification.

Our invention relates to an improvement in the art of producing dyestuffs on the fiber by means of the one-bath method, consisting in developing the dyestuffs by passing into acid agents the cotton goods, which have been impregnated with the solution of an ayrlamid of 2.3-oxynaphthoic acid of the general formula:

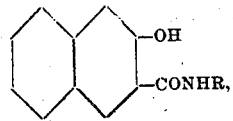

wherein R means an aromatic radical, and of a nitrosamin salt of the general formula:

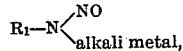

wherein $R_1$ means also an aromatic radical, obtainable by causing an alkali to act upon a diazo solution. Under the term "acid agents" we include feeble acids or acid salts.

As compared with the process, described in the German Letters Patents No. 81791 and 83010 according to which beta-naphthol and a nitrosamin salt are used, by the present process, according to which the arylamids of 2.3-oxynaphthoic acid are used excellent results and brilliant red shades are obtained and the new pastes containing an arylamid of 2.3-oxynaphthoic acid and a nitrosamin, are distinguished from those containing beta-naphthol, by their essentially greater stability. Therefore the present process represents an important improvement, since thereby we were successful in solving a problem which others have tried to solve many times without success, viz: to print ice-colors directly without the antecedent preparation of the fiber and to produce very fast and brilliant shades by a cheap and simple method.

The present process is materially distinguished from those, described in the United States Letters Patent No. 913634 and the German Letters Patent No. 238841 according to which the 2.1-naphtholsulfonic acid and the 2.1-naphthol carboxylic acid respectively are used as starting compounds, since in the present case the carboxylic acid is not split off and therefore no beta-naphthol dyestuffs are formed.

In order to illustrate the new process more fully the following examples are given, parts being by weight.

Example I: 24 g. of anilid of 2.3-oxynaphthoic acid, 40 ccm. of caustic soda lye of 35° Bé. and 50 g. of sodium ricinoleate of 60 per cent. strength are dissolved in 150 g. of hot water, cooled down and poured into a solution of 18 g. of nitrosamin-alkali metal salt of para-nitranilin of the formula:

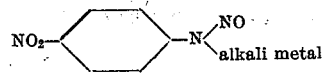

in 150 g. of water and 500 g. of tragacanth thickening 1:15 are added. Cotton goods are printed with this solution, dried and passed at 80° C. in a solution containing 20 g. of sodium bichromate per liter. A beautiful fast red is obtained in this way.

Example II: 12 g. of anilid of 2.3-oxynaphthoic acid, 20 ccm. of caustic soda lye of 30° Bé., 20 g. of the sodium salt of Turkey red oil are dissolved in 300 g. of water and a solution of 9 g. of nitrosamin-alkali metal salt of para-nitranilin in 200 g. of water is added and the whole is made up to 1 liter. The yarn is impregnated with this solution, wrung out and passed in a wet condition without being dried in a hot bath of 10 g. of sodium bichromate per liter. After washing and soaping a beautiful red is obtained.

Example III: 24 g. anilid of 2.3-oxynaphthoic acid, 40 ccm. of caustic soda lye of 34° Bé., 60 g. of sodium ricinoleate of 60 per cent. strength are dissolved at 260 g. of hot water, cooled down and poured into a solution of 19 g. of nitrosamin-alkali metal salt of meta-nitro-para-toluidin of the formula:

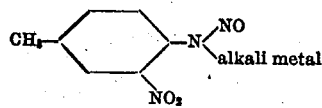

and 500 g. of tragacanth thickening 1:15 are added. Cotton goods are printed with this solution, dried and passed at 80° C. in a solution of acetic acid (8° Bé.), containing 50 g. per liter. In this way a very pure brilliant red of an excellent fastness is obtained, which is very similar to the alizarin red.

Example IV: 12 g. of anilid of 2.3-oxynaphthoic acid, 20 g. of caustic soda lye of 34° Bé., 40 g. of sodium ricinoleate of 60 per cent. strength are dissolved in 330 g. of hot water, cooled down and poured into a solution of 11 g. of nitrosamin-alkali metal salt of para-nitro-ortho-anisidin of the formula:

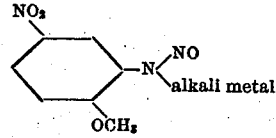

and 550 g. of tragacanth thickening 1:15 are added. Cotton goods are printed with this solution, dried and passed at 80° in a solution of acetic acid (8° Bé), containing 50 g. per liter. In this way a very beautiful bluish red is obtained.

With other nitrosamin salts and other arylamids of 2.3-oxynaphthoic acid the process can be executed in the same manner.

Now what we claim and desire to secure by Letters Patent is the following:

In the art of producing dyestuffs on the fiber by means of the one-bath method, the improvement which consists in developing the dyestuffs by passing into acid agents, the cotton goods, which have been impregnated with the solution of an arylamid of 2.3-oxynaphthoic acid of the formula:

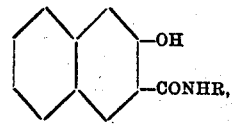

wherein R means an aromatic radical and of a nitrosamin salt of the general formula:

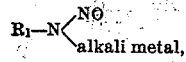

wherein $R_1$ means also an aromatic radical.

That we claim the foregoing as our invention, we have signed our names in presence of two witnesses, this 30th day of March 1914.

FELIX KUNERT.
EDWIN ACKER.

As to Felix Kunert:
  JEAN GRUND,
  CARL GRUND.
As to Edwin Acker:
  CLARENCE CARRIGAN,
  MARIUS HERMANN.